June 25, 1963  A. FRIEDMAN  3,094,716
MOLDING OF SEAT CUSHIONS

Filed June 30, 1960  2 Sheets-Sheet 1

INVENTOR
ALEX FRIEDMAN
BY
Bierman + Bierman
ATTORNEYS

June 25, 1963  A. FRIEDMAN  3,094,716
MOLDING OF SEAT CUSHIONS
Filed June 30, 1960  2 Sheets-Sheet 2

INVENTOR
ALEX FRIEDMAN
BY
ATTORNEYS

United States Patent Office 3,094,716
Patented June 25, 1963

3,094,716
MOLDING OF SEAT CUSHIONS
Alex Friedman, 620 Prospect Place, Brooklyn 16, N.Y.
Filed June 30, 1960, Ser. No. 40,027
7 Claims. (Cl. 5—345)

The present invention is directed to the making of cushioned articles by a molding operation, such articles including seats, seat backs, paddings, shock absorbers for items such as delicate instruments, and for other purposes.

Prior cushioned articles for the above purposes were generally made by assembling a base, a pad, and a flexible fabric cover, and tacking or nailing the edges of the fabric to the underside of the base. This was essentially a hand operation requiring considerable skill. It was expensive as the operation was time consuming. Also the results were not uniform in that the fabric was subjected to a pull by the operator at one area at a time, as the result of which the tension was non-uniform causing wrinkles to develop. The tacking was often defective and tacks or nails became loosened during the use of the cushion making repairs necessary. To overcome some of the difficulties it was proposed to make the fabric cover of several pieces of fabric stitched together and to reinforce the seams to withstand ordinary usage, but this added further to the cost of manufacture and where was substantial waste of fabric.

The present invention is intended and adapted to overcome the difficulties and disadvantages inherent in prior methods of making cushioned articles, it being among the objects thereof to provide a method which is simple, effective and economical in operation.

It is also among the objects of the invention to provide a method which produces an article of the type described which is a one-step operation, conducted in a very short time and eliminating substantially completely the necessity for highly skilled labor in the operation.

It is further among the objects of the invention to produce a cushioned article which is strong, can withstand rough usage, and wherein there is no danger of the fabric cover becoming loosened or wrinkled or the padding being displaced from its normal position.

In the practice of the invention, instead of a hand operation, the cushioned article is made by a molding of the several elements to form a unitary product. There is placed on the lower platen of a press a support, which is usually of plywood, and upon this is placed a base for a pad. In one embodiment, the base has its edges extending beyond the edges of the support. On the base is placed a pad of any suitable material with its edges in vertical register or alinement with the base. The edges of the base are coated with a suitable heat and/or pressure sensitive adhesive.

A flexible cover, usually of woven fabric is placed on the surface of the pad with the edges of the cover extending sufficiently beyond the edges of the pad to at least cover the edge of the base. The underside of the cover is also coated with a suitable heat or pressure sensitive. Then a die, usually a female die, attached to the upper platen is lowered to contact the surface of the cover, the depending sides of the die causing the edges of the cover to contact the edges of the base with sufficient pressure to cause adhesive to be activated, if a pressure sensitive adhesive is used. In case heat sensitive adhesives are used, the press is heated and usually the upper platen is heated by well known means. After the molding is accomplished the product is removed from the press and the edges of the cover, which extend beyond the base, are trimmed off.

To avoid the necessity of a separate trimming operation, the method is modified by utilizing a support which extends beyond the edges of the base. The edges of the female top die which touch the edges of the cover are formed with knife edges. Thereby, in pressing the cover onto the base, the knife edges go beyond and cut off the free ends of the cover against the extending surface of the support.

While a rigid base is used, it need not be absolutely rigid but it is only necessary that it be sufficiently rigid to support the soft pad. In other words, the base should be more firm than the pad. In many cases the base is substantially thinner than the pad. During the molding, the cover may be placed under a sufficient tension, by clamps or other means, to stretch the fabric so that when the tension is released the fabric tends to contract and thus wrinkles are avoided.

The form of the seats may vary greatly. They may be circular, oval, rectangular and of irregular shapes. Ribs may be formed therein to give attractive designs. The seats may be of various depths and they may be formed on frames, such as in automobiles, settees or the like.

In the accompanying drawings constituting a part hereof, in which like reference characters indicate like parts, FIG. 1 is a diagrammatic vertical cross-sectional view of a press having all the elements of the articles to be formed, in position for the molding operation;

Figure 1:
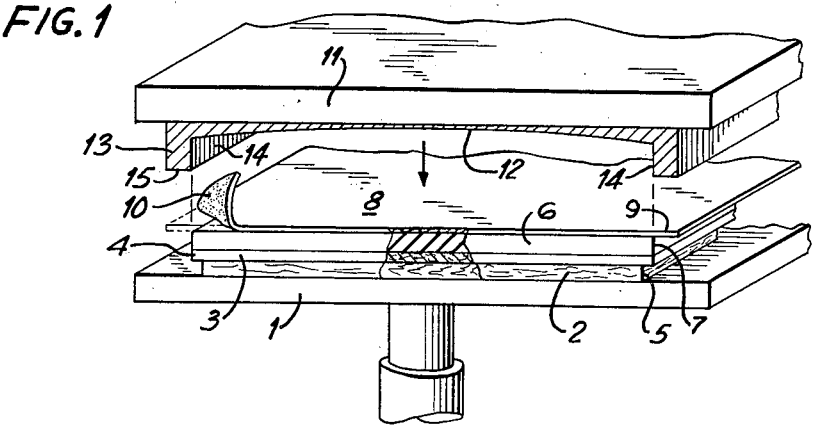

Referring to FIG. 1, there is placed on lower platen 1 of the ordinary hydraulic molding press a flat support 2 which is of plywood or other suitable material. On top of this is placed a flat base 3, the edges 4 thereof extending beyond the edges 5 of support 2. Then a flat pad 6 of cushioning material is placed on base 3 with its edges 7 in substantial alinement with edges 4. Edges 4 and 7 are preferably at right angles to the face of platen 1; that is, they are in vertical alinement. A flexible fabric cover 8 is placed on top of pad 6 with its edges 9 extending sufficiently beyond the edges of the pad so that on being folded down, the edges of the cover will contact edges 4 of the base, as well as edges 7 of the pad. Adhesive 10 is coated on the underside of cover 8 over that area which is to contact edges 4 and 7, and a similar adhesive is coated on edges 4.

On the underside of upper platen 11 of the press is secured the female die having a convex inner face 12 and depending sides 13, the inner edge 14 of sides 13 being in alinement with edges 7 and 4. If the adhesive is heat sensitive, platen 11 is heated to the proper activating temperature. Upon the lowering of platen 11, lower end 15 engages edges 9 of cover 8 pressing them against edges 7 and 4. At this stage, face 12 of the die contacts cover 8 and compresses pad 6, and then edges 9 are forced against edges 4 at the completion of the downward movement of platen 11 and held there until the adhesive is set. Platen 11 is raised, the molded cushion is removed and the ragged ends of cover 8 are trimmed off close to base 3.

Figure 2:
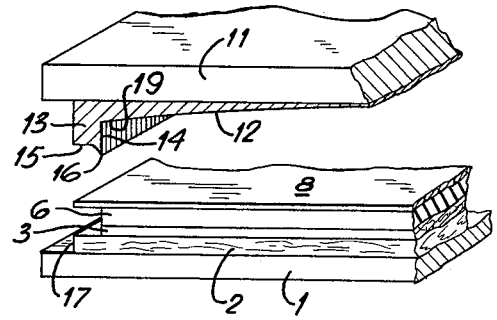
FIG. 2 is a fragmentary diagrammatic vertical cross-sectional view of the press of FIG. 1 showing a modified form of the invention.
Figure 3:
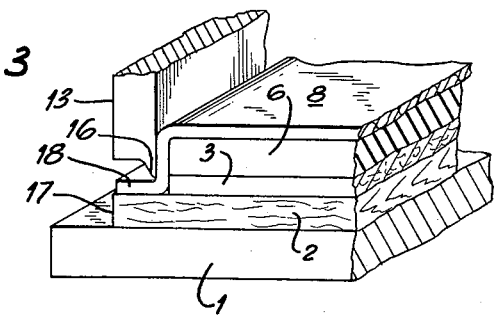
FIG. 3 is an enlarged fragmentary vertical cross-sectional view of the knife edges of the female die in position to trim the ends of the cover.

In FIG. 2 is shown a modification wherein the trimming is simultaneous with the molding. Inner edge 14 of the die is provided with a sharp or knife edge 16. Support 2 extends beyond the edge of base 3 as seen at 17, and constitutes an anvil to assist knife edge 16 in the cutting off of the free or loose edges of the fabric. When platen 11 descends, knife edge 16 folds edges 9 down without cutting the fabric since no pressure is then exerted thereon. When platen 11 is at the bottom of its travel, knife 16 pinches ends 18 of the cover against extension 17 and cuts it off cleanly, thus eliminating a separate trimming operation.

The base may be of any suitable material, such as wood, metal, synthetic plastic, particle board, filled resin or the like. It may be preformed or, in some cases, may be formable during molding. It is necessary that the base be of sufficient rigidity for the purpose to which the finished product is to be applied. Many materials are available for the pad, such as foam rubber, Spanish moss, cotton fibers, coated fibers, horsehair, sisal, hemp, excelsior, felt and others. The materials should have proper resilience. Upholstery fabrics of any usual material such as cotton, wool, silk or synthetic fibers, whether smooth, textured or piled, are suitable, provided they have the proper strength. It is preferable to use fabrics containing at least a substantial percentage of synthetic fibers, such fabrics being capable of entering into the molding without causing wrinkles to form in the molded seat face or sides. The mold is usually of metal but where no heating is necessary, as where a pressure sensitive adhesive is used, it may be of synthetic plastic, hard rubber, and others. The use of such adhesives is indicated particularly when synthetic fabrics are involved.

To assist in keeping the fabric cover from developing wrinkles during the molding, pad 6 is of such shape that the rim thereof is first subjected to pressure by the lower portion 19 of arc 12. Thereby cover 8 is progressively stretched until the entire face thereof is contacted by the die at the end of the molding.

Any of a number of adhesives may be used. A typical heat sensitive adhesive is an emulsion or dispersion in water of a vinyl acetate resin having a viscosity of about 1500 to 2500 centipoises and a pH of about 4 to 5, the dispersion containing about 55% to 60% solids. A typical pressure sensitive adhesive is described in Patent No. 2,610,910.

Figure 4:
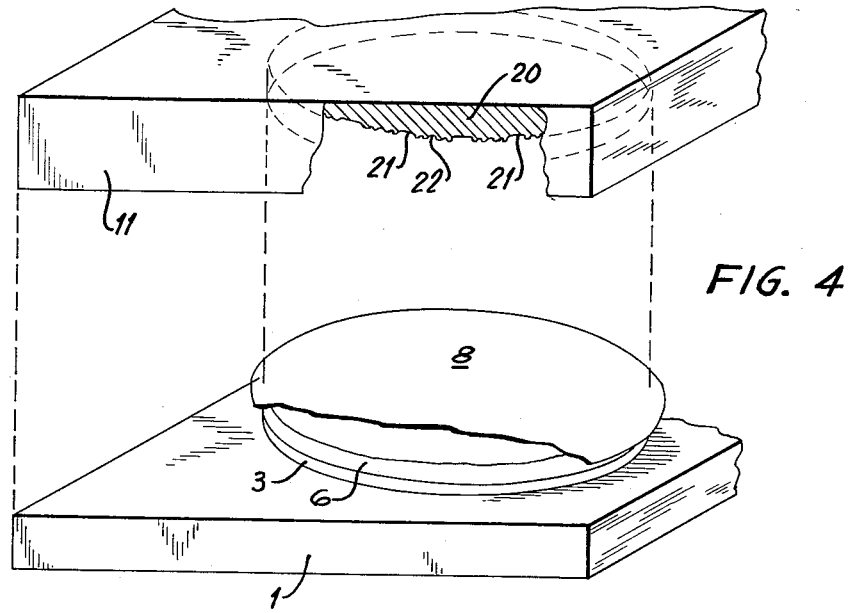
FIG. 4 is a view of a modified form of the invention wherein ribs are formed in the upper face of the seat.
Figure 5:
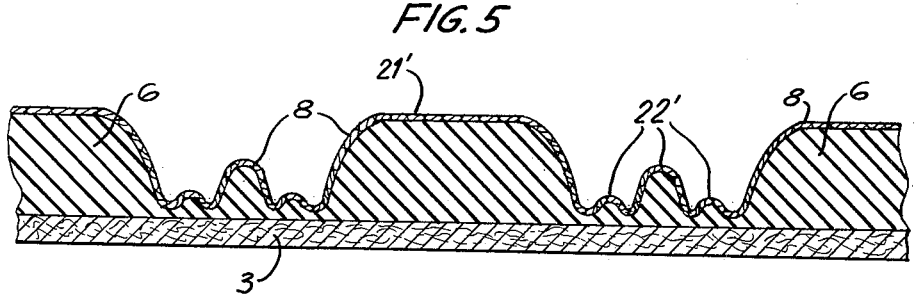
FIG. 5 is a view of the product formed in the apparatus of FIG. 4.

FIGS. 4 and 5 represent a modification of the invention in which a special form of mold is used in order to obtain ribs or ridges of a predetermined pattern on the molded seat. The lower plate 1 has a hard fiber base 3 thereon so that the seat cushion may be formed integrally therewith. Upper plate 10 is provided with a female mold 20 having longitudinal flattened portions 21 and rib-like portions 22 between the flattened portions 21. The molding of the material is as previously described and FIG. 5 is a cross-section of the finished product. Relatively wide ribs 21 are spaced apart and between them are a plurality of short ribs 22'. The process lends itself to the production of irregularly surfaced seat cushions without the formation of wrinkles therein.

It is not clear to applicant why wrinkles are avoided but it may be that the fabrics used have some elasticity and compressibility so that when the molding pressure is placed thereon, the fibers are able to move and to be either forced more closely together or separated, thereby giving a smooth surface to the seat cushion. The same applies to the fact that the depending or flange portion of the seat is smooth and free from wrinkles even though the sides of the cushion are practically at right angles to the direction of force exerted in the closing of the mold.

I claim:

1. A method of making a cushion having a substantially rigid base comprising the steps of placing a cushioned pad on said rigid base, said pad being of substantial thickness throughout the area thereof, the edges of said cushioned pad being approximately in register with the edges of said base, placing a flexible cover on said cushioned pad, the edges of said cover extending beyond the edges of said pad sufficiently so that they overlap said base, applying adhesive to the edges of at least one of said cover and said base, and applying pressure uniformly to said cover around the entire periphery only of said pad, said pressure tightly stretching said cover over said pad, and bringing the edges of said cover into contact with the adhesive on said cover and base to bond said cover to said base.

2. A method according to claim 1 characterized in that the adhesive is heat sensitive and heat is applied to activate said adhesive.

3. A method according to claim 1 characterized in that the adhesive is pressure sensitive and there is exerted sufficient pressure on the contacting edges of said cover and base.

4. A method according to claim 1 characterized in that said base is laid on a support.

5. A method according to claim 1 characterized in that the edges of said support extend beyond the edges of said base and cushion pad.

6. A method according to claim 1 characterized in that the edges of said support terminate within the edges of said base and cushion pad.

7. A method according to claim 1 characterized in that the edges of said support extend beyond the edges of said base and cushion pad, and said pressure cuts off excess cover which may be in contact with said support edges after said contact with said adhesived cover and base.

References Cited in the file of this patent

UNITED STATES PATENTS

| 1,838,102 | McGovern | Dec. 29, 1931 |
| 2,184,140 | Cunnington | Dec. 19, 1939 |
| 2,293,751 | May | Aug. 25, 1942 |
| 2,311,068 | Millar | Feb. 16, 1943 |
| 2,316,687 | Hammond | Apr. 13, 1943 |
| 2,431,873 | Kennelly | Dec. 2, 1947 |
| 2,606,598 | Smith | Aug. 10, 1952 |
| 2,626,226 | Adair | Jan. 20, 1953 |
| 2,791,268 | Mendelsohn | May 7, 1957 |